United States Patent Office 3,150,993
Patented Sept. 29, 1964

3,150,993
STARCH COMPOSITION
Cleo Eldred Hanson and John V. Tuschhoff, Decatur, Ill., assignors to A. E. Staley Manufacturing Company, Decatur, Ill., a corporation of Delaware
No Drawing. Filed June 26, 1962, Ser. No. 205,230
7 Claims. (Cl. 106—210)

This invention relates to an improved enzyme converting starch composition which comprises a hypochlorite oxidized starch acylate and ethylenediamine polyacetic acid. More specifically, this invention relates to an improved enzyme converting starch composition which comprises a hypochlorite oxidized cereal starch acetate and ethylenediamine tetraacetic acid.

Enzyme converting starches have been prepared by a wide variey of techniques in order to give the enzyme converting starch desirable properties. However, until now, no one has prepared an enzyme converting cereal starch which (1) converts rapidly, (2) forms a white, sludge free paste, (3) forms a paste which does not set back. One method of solving the sludge problem normally associated with cereal starches was to oxidize the granular starch with alkaline hypochlorite in order to destroy the proteinaceous material in the starch. While this treatment is relatively effective, it suffers from the disadvantage that the oxidized starch cannot be as readily converted with enzymes as the untreated starch.

It has been found that the enzyme convertibility of these alkaline hypochlorite oxidized cereal starches can be improved to the point where they convert more readily than unmodified starches by esterifying a limited number of hydroxyl groups on the starch molecule. Further, when the acylation is carried out to a sufficiently high level, subsequently enzyme converted starch paste has improved set back properties. (That is, the viscosity build-up of the starch paste on aging is relatively small even when stored at room temperature for one week.) Unfortunately, the pastes of these enzyme converted, hypochlorite oxidized starch acylates have an undesirable yellow color. The general object of this invention is to provide an enzyme converting hypochlorite oxidized starch, which converts rapidly to form a white sludge free paste. A further object of this invention is to provide an enzyme converting starch, which has improved set back properties in addition to all of the aforementioned desirable properties.

We have now found that the addition of ethylenediamine polyacetic acid or a water-soluble salt thereof to a hypochlorite oxidized starch acylate results in an enzyme converting starch which forms a white sludge free paste. Further, the ethylenediamine polyacetic acid does not interfere with the enzyme conversion and in fact, the indications are that the presence of an ethylenediamine polyacetic acid may even result in a faster enzyme conversion.

Suitable ethylenediamine polyacetic acids and water-soluble salts thereof include the alkali metal salts of ethylenediamine-tetraacetic acid, the sodium salt of ethylenediaminedi-(orthohydroxy-phenyl)-diacetic acid, the sodium salt of ethylenediaminedi-(hydroxy-ethyl)-diacetic acid, etc. The readily available, low cost sodium salts of ethylenediaminetetraacetic acid are particularly preferred. The aforementioned materials are effective in a proportion of from 0.05% to 1% by weight of the dry alkaline hypochlorite oxidized starch acylate, preferably in a concentration of about 0.1–0.2% by weight. Below about 0.05% by weight the enzyme converted starch paste has a yellow color. The upper limit in the proportions is dictated solely by economics. Generally, there is little reason to use more than 0.2% by weight of the ethylenediamine polyacetic acid based on the weight of the dry starch.

The alkaline hypochlorite oxidized cereal starch acylates can be prepared from any native cereal starch such as corn starch, rice starch, wheat starch, and amylose and amylopectin fractions therefrom.

The alkaline hypochlorite oxidation of starch can be carried out by any known technique. See, for example, pages 338 and 339 of Kerr, Chemistry and Industry of Starch, 2nd Edition (1950). The preferred method of operation comprises suspending the starch in an aqueous system (10% to 60% by weight dry substance) and then adding an alkaline hypochlorite solution of about 1% to 15% by weight active ingredients. The starch is preferably treated with a sufficient amount of bleach to furnish from about 0.5% to 1.0% by weight chlorine based on the weight of the starch. Below about 0.5% chlorine all of the protein in cereal starches, such as corn starch, is not destroyed and accordingly, the enzyme converted starch paste contains sludge. Above about 1.0% by weight chlorine the starch is considerably harder to convert with enzyme. Suitable alkali for this process includes sodium hydroxide, potassium hydroxide, sodium carbonate, calcium hydroxide, etc. As pointed out in Kerr, this conversion is usually carried out at about 90–125° F.

The alkaline hypochlorite oxidized starch is then reacted with an acylating reagent such as vinyl acetate, vinyl propionate, acetic anhydride, propionic anhydride, etc., using any of the aforementioned alkaline material under conventional reaction conditions. (See, for example, U.S. Patents 3,022,289 and 2,461,139.) Generally the acylation reaction is carried out at a pH of about 7–12.5 under non-gelatinizing conditions. These acylating agents may be used in a concentration of about 0.1–10% by weight of the dry starch.

The concentration of acylating agent employed is not critical so long as the product has the proper D.S. (degree of substitution). The alkaline hypochlorite oxidized starch acylates of this invention preferably have an acylate D.S. of about 0.01 to 0.12. Surprisingly, while even a very small amount of acylate groups catalytically improves the enzyme convertibility of the hypochlorite oxidized starch, larger amounts of acylate groups (above about 12 acylate groups per each 100 anhydroglucose units) inhibit the enzyme convertibility of the hypochlorite oxidized starch. The preferred derivatives of this invention have a D.S. of about 0.03 to 0.10. While the enzyme convertibility of the hypochlorite oxidized starches is improved by the presence of only 1 acylate group per each 100 anhydroglucose units, we have found that as the number of acylate groups per each 100 anhydroglucose units increases to about 3 or 4, the subsequently enzyme converted starch pastes exhibit markedly improved set back properties.

The granular hypochlorite oxidized starch acylates are then compounded with the aforementioned ethylenediamine polyacetic acids and the water-soluble salts thereof.

The examples following are merely illustrative and should not be construed as limiting the scope of the invention.

*Example 1*

One hundred parts of corn starch (dry solids basis) was suspended in 120 parts of water. The slurry was then treated with 0.8 part chlorine and 1.04 parts sodium hydroxide in a 4.1 titre bleach. The reactants were maintained at 100° F. with stirring for 2 hours. The reaction was terminated by adding 0.5 part sodium bisulfite. Three parts sodium carbonate and 3 parts vinyl acetate were then added to the reaction vessel while maintaining the reaction at 100° F. The esterification reaction was terminated fifteen minutes after the addition of the vinyl acetate by adding sufficient hydrochloric acid to adjust the pH of the reaction mixture to about 4.5. The granular starch was filtered, washed with water and dried to about 12% by weight moisture. The dried product was blended with sufficient hydrated lime to adjust the pH of the starch to about 6.3–6.9 pH. Then 0.11 parts of the tetrasodium salt of ethylenediamine tetraacetic acid was added to the hypochlorite oxidized starch acetate, which had a D.S. of about 0.04.

The hypochlorite oxidized starch acetate composition was converted with Vanzyme to less than 300 c.p.s. in 15 minutes. The paste was white with virtually no sludge and exhibited excellent set back characteristics when held at room temperature for one week.

Essentially the same results are obtained by increasing the ethylenediamine tetraacetic acid concentration to 0.20 part.

*Example II*

Example I was repeated except that no color stabilizer was added to the hypochlorite oxidized starch acetate. The product was converted with Vanzyme to less than 300 cps. in about 15 minutes. The paste had a dull yellow color.

*Example III*

Example I was repeated except that only 1 part of vinyl acetate was used in the acylation step. The product which had an estimated D.S. of about 0.015 was converted with Vanzyme to less than 300 cps. in about 15 minutes. The paste was white with virtually no sludge but it did not have the excellent set back properties of the product of Example I.

Since many embodiments of this invention may be made and since many changes may be made in the embodiments described the foregoing is to be interpreted as illustrative only and my invention is defined by the claims appended hereinafter.

We claim:

1. An enzyme converting starch composition comprising a hypochlorite oxidized starch acylate wherein said acylate is selected from the group consisting of acetate and propionate, having an acyl D.S. of about 0.01 to about 0.12 and a color stabilizer selected from the group consisting of ethylenediamine polyacetic acid and its water-soluble salts.

2. An enzyme converting starch composition comprising a hypochlorite oxidized cereal starch acylate, wherein said acylate is selected from the group consisting of acetate and propionate, having an acyl D.S. of about 0.01 to about 0.12 and from 0.05 to 1.0 part per each 100 parts of starch of a color stabilizer selected from the group consisting of ethylenediamine polyacetic acid and its water-soluble salts.

3. The composition of claim 2 wherein the ethylenediaminepolyacetic acid comprises ethylenediaminetetraacetic acid.

4. An enzyme converting starch composition comprising a hypochlorite oxidized cereal starch acetate having an acyl D.S. of about 0.01 to about 0.12 and from about 0.05 to 1.0 part per each 100 parts of starch of a color stabilizer selected from the groups consisting of ethylenediamine polyacetic acid and its water-soluble salts.

5. The composition of claim 4 wherein the color stabilizer comprises the tetra sodium salt of ethylenediaminetetraacetic aicd.

6. The composition of claim 4 wherein the cereal starch is corn starch.

7. The composition of claim 4 wherein the hypochlorite oxidized cereal starch acetate has an acyl D.S. of at least 0.03.

References Cited in the file of this patent

UNITED STATES PATENTS

| | | |
|---|---|---|
| 2,461,139 | Caldwell | Feb. 8, 1949 |
| 2,497,838 | Newton | Feb. 14, 1950 |
| 2,844,515 | Sabotka et al. | July 22, 1958 |
| 3,022,289 | Tuschhoff et al. | Feb. 20, 1962 |